United States Patent [19]

Tukala et al.

[11] Patent Number: 4,993,890
[45] Date of Patent: Feb. 19, 1991

[54] MILLING CUTTER AND CARTRIDGE THEREFOR

[75] Inventors: Tommy S. Tukala; Per Nilsson; Lars-Gunnar Wallstrom, all of Sandviken, Sweden

[73] Assignee: Sandvik AB, Sandviken, Sweden

[21] Appl. No.: 351,486

[22] Filed: May 15, 1989

[30] Foreign Application Priority Data

Jun. 16, 1988 [SE] Sweden ............... 8802256

[51] Int. Cl.$^5$ ............... B23C 5/22; B23C 5/08
[52] U.S. Cl. ............... 407/34; 407/40; 407/46
[58] Field of Search ............... 407/33, 34, 40, 41, 407/46, 47, 48, 49, 66, 79, 92, 102, 103, 104, 105, 11 B, 1 A, 115, 51, 52, 101

[56] References Cited

U.S. PATENT DOCUMENTS 1,354,578 10/1920 Ritchie ............... 407/115
3,701,187 10/1972 Erkfritz ............... 407/115
4,566,826 1/1986 Dickinson ............... 407/41
4,610,285 9/1986 Derivaz ............... 407/49
4,743,144 5/1988 Shikata ............... 407/42

FOREIGN PATENT DOCUMENTS 3125185 1/1983 Fed. Rep. of Germany .

Primary Examiner—William E. Terrell
Assistant Examiner—Jack Lavinder
Attorney, Agent, or Firm—Burns, Doane, Swecker & Mathis

[57] ABSTRACT

The invention provides a milling cutter for machining metal workpieces and a cartridge therefor. The milling cutter comprises a plurality of peripheral recesses for the receipt of insert-equipped cartridges. One of the walls of said recess is provided by two arms integral with the milling cutter body that each by means of a screw is arranged to clamp the cartridge against one wall in said recess. The cartridge is provided with two bores having suitable clearance for the receipt of said screws.

13 Claims, 8 Drawing Sheets

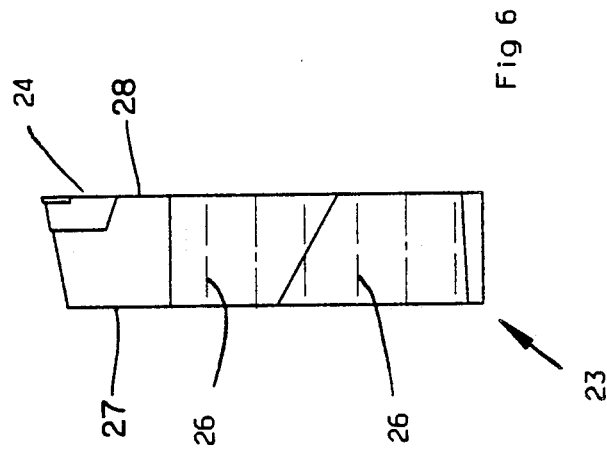
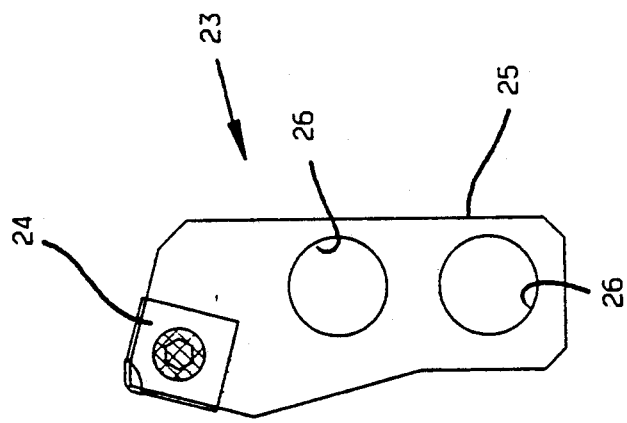 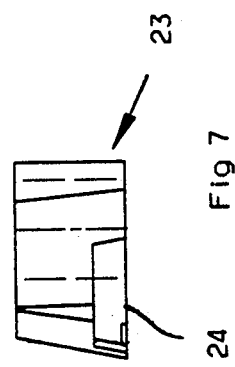

MILLING CUTTER AND CARTRIDGE THEREFOR

BACKGROUND OF THE INVENTION

The present invention relates to a milling cutter for chip machining of metal workpieces and a cartridge therefor. The milling cutter comprises a milling cutter body rotatable about its longitudinal axis and a plurality of insert-equipped cartridges mounted around the periphery thereof. Each cartridge is located in a recess in the periphery of said milling cutter body. The cartridge is intended to be secured in the recess by suitable clamping means.

A milling cutter of the aforesaid type is disclosed in German patent No. 31 25 185 wherein each cartridge is adjustable radially and axially by wedge means. Two wedge means are associated with each cartridge. A screw which extends through the cartridge and into the milling cutter body is arranged to absorb the forces caused by said cartridge and by wedge means during the rotation of the milling cutter. During the milling operation a higher rotation speed is applied which may result in an out-hurling force of 200 kg applied upon a body of for instance 30 g. This means that the screw that is holding the cartridge and the wedge will be subjected to large bending moments during the milling operation. The risk for tool failure will increase with increased usage time. Further, there is a risk that the adjustment of the insert in the cartridge might be changed during a working operation. Also, it becomes less economical and more complicated to arrange a wedge arrangement for each cartridge.

The present invention aims to provide a solution to the above related problems.

THE DRAWINGS

The invention will now be described more in detail with reference to the attached drawings.

FIGS. 5-7 show a cartridge designed according to this invention as seen in plan view, in side view and in end view respectively.

DETAILED DESCRIPTION OF A PREFERRED EMBODIMENT OF THE INVENTION

Figure 1:
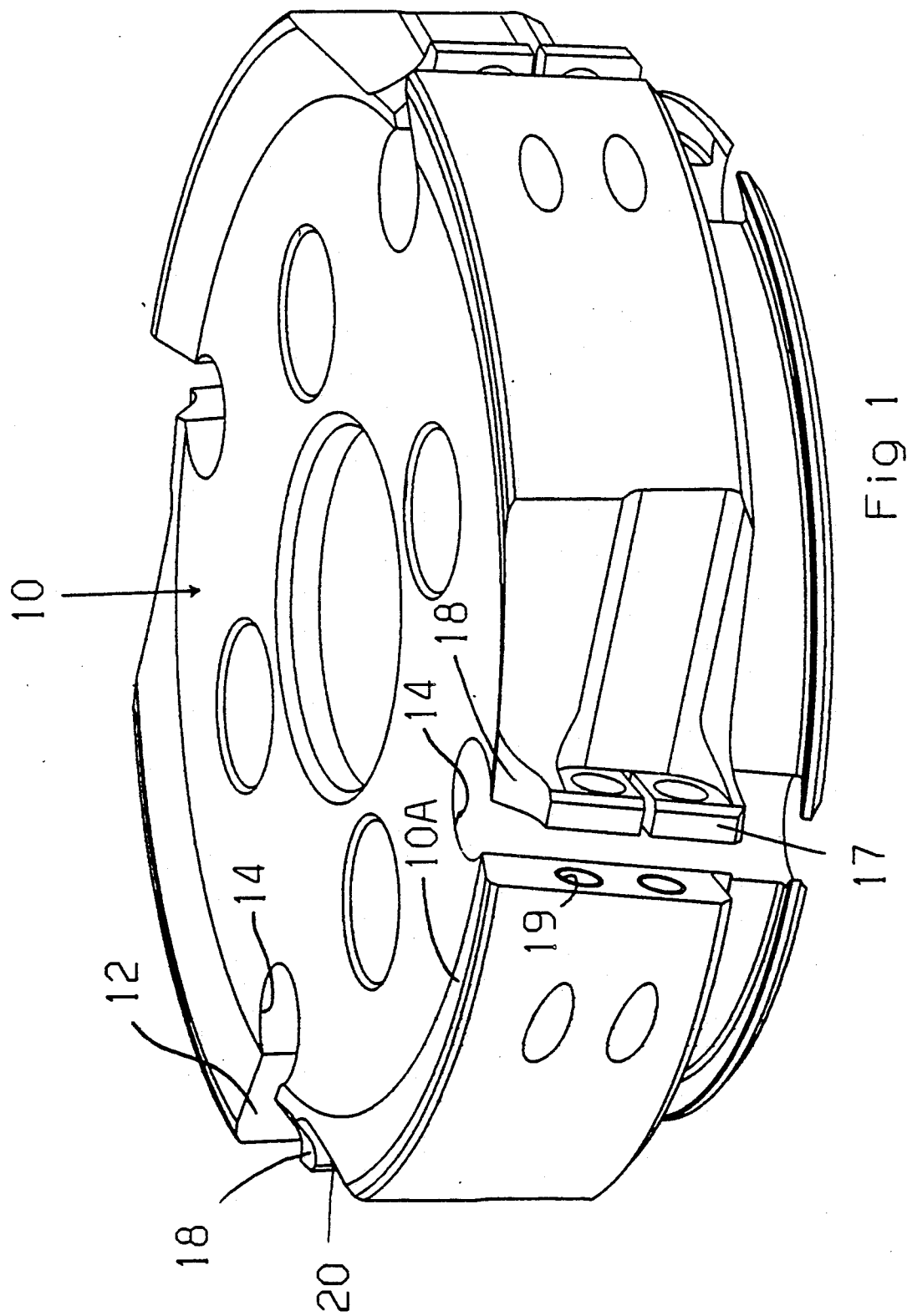
FIG. 1 shows one embodiment of a milling cutter body according to this invention as seen in a perspective view.
Figure 2:
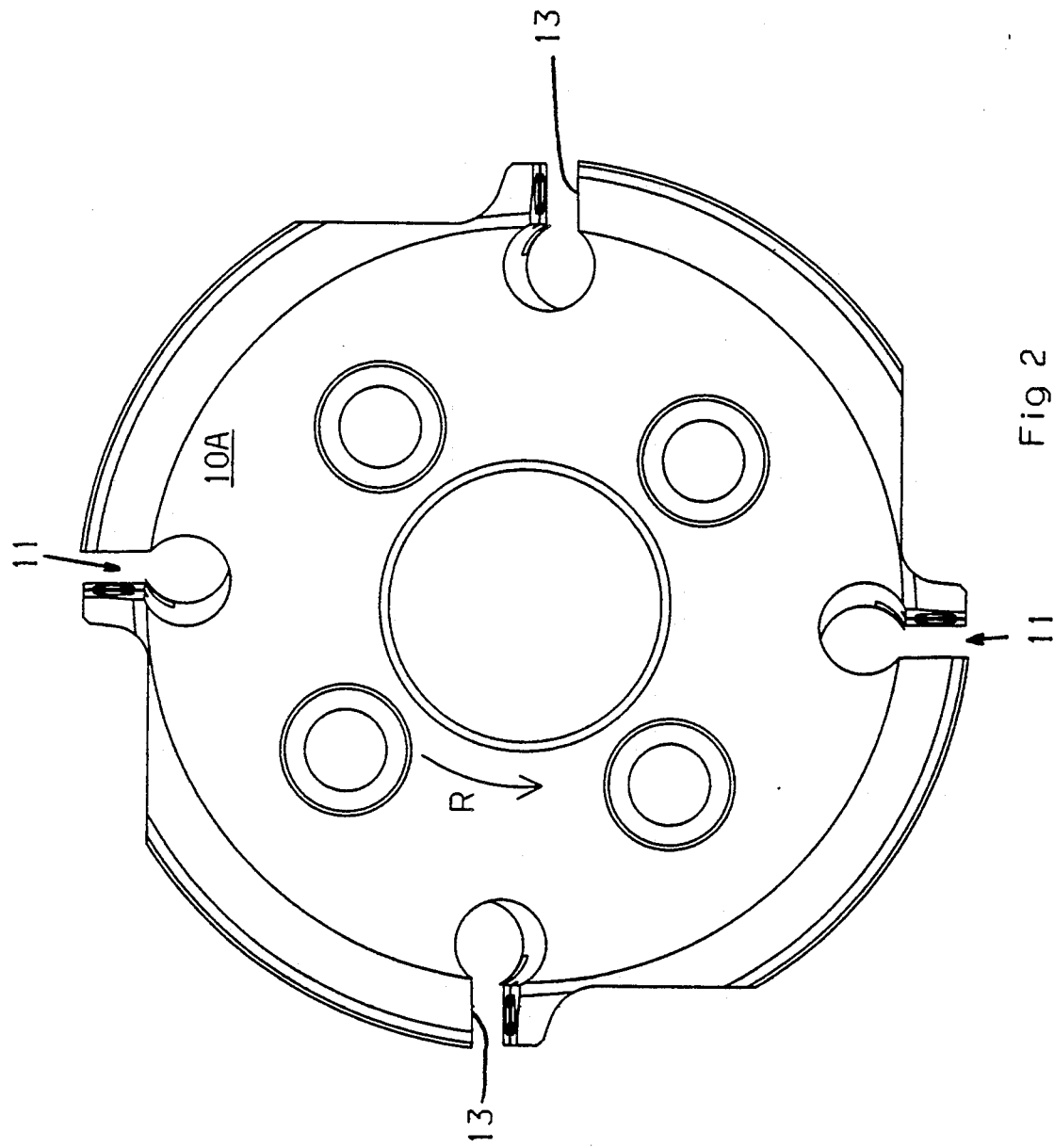
FIG. 2 shows a plan view of the milling cutter shown in FIG. 1.
Figure 3:
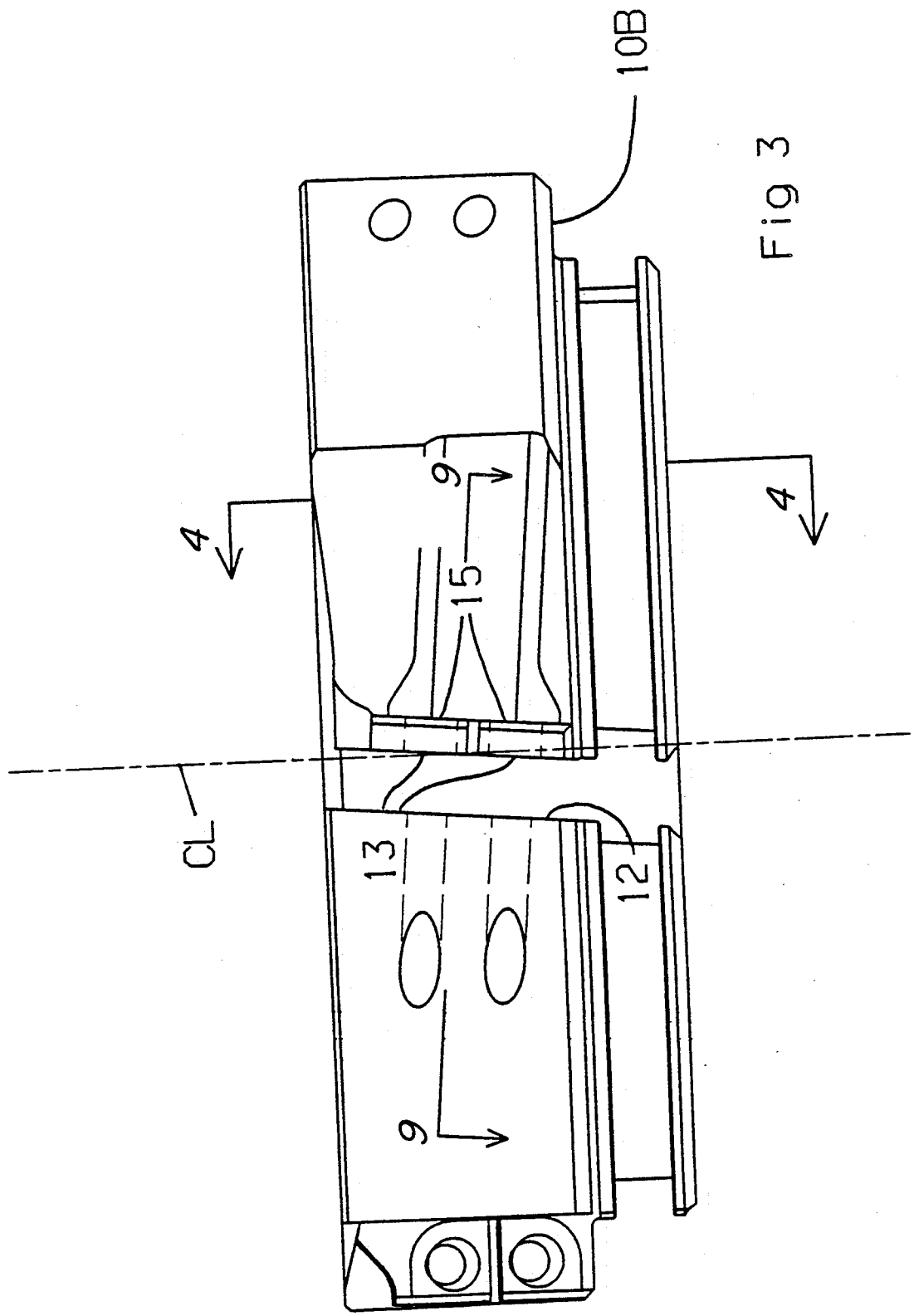
FIG. 3 shows a side view of the milling cutter shown in FIG. 1.
Figure 4:
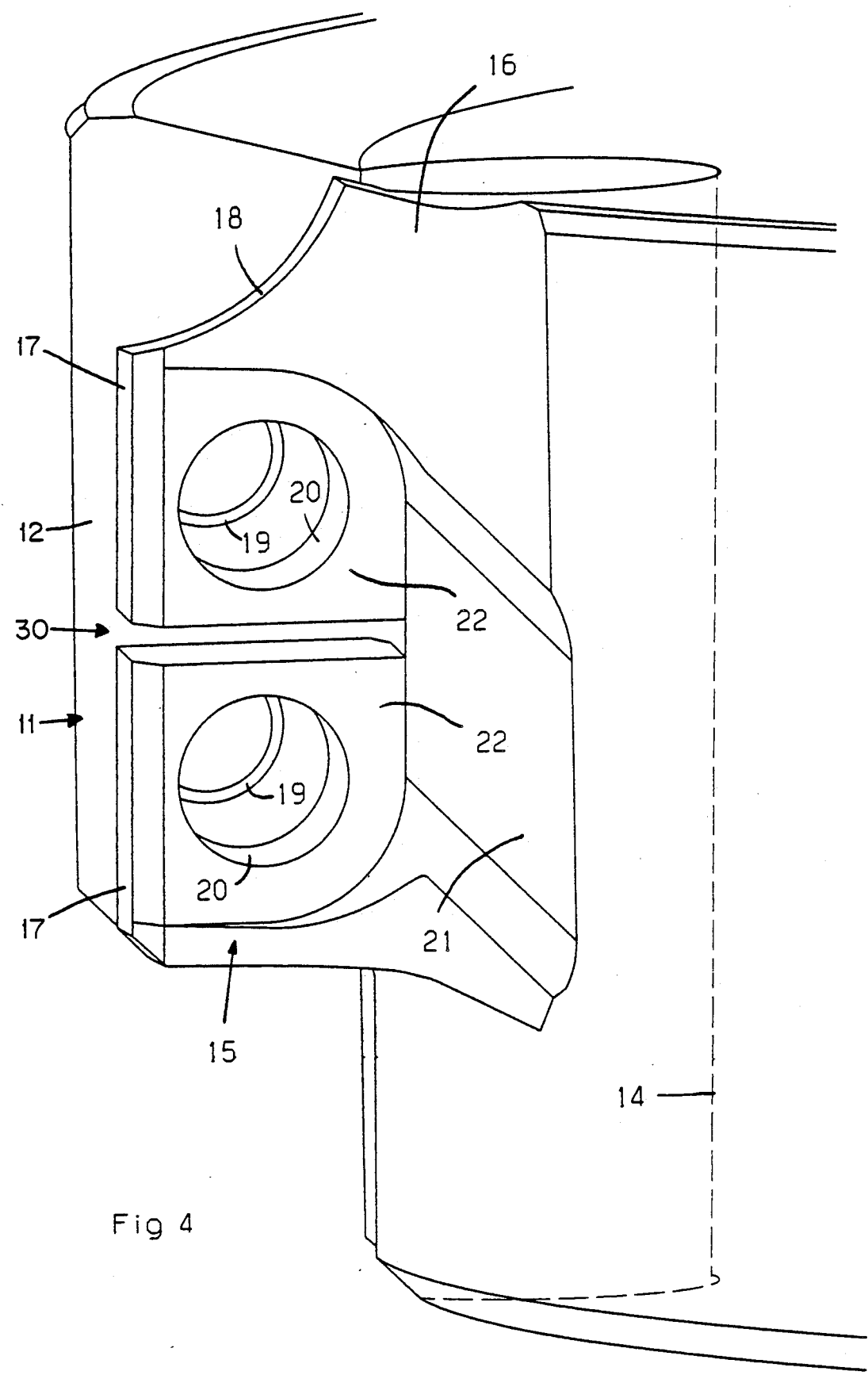
FIG. 4 shows a cross-section along the line IV—IV in FIG. 3.

FIGS. 1 to 4 show a milling cutter body 10 having a multiplicity of peripheral recesses 11 for the receipt of insert-equipped cartridges. The milling cutter body is arranged to rotate around the central axis CL in the direction R. The recesses 11 are evenly distributed around the periphery of the body 10; in this case there are four of them. Each recess consists of a rear supporting surface a wall 12, as seen in rotary direction R, and a forwardly located support surface or wall 13 which are connected by a substantially partly cylindrically shaped recess 14. This recess 14 can alternatively have other shapes, for instance oval shape, rectangular shape or other.

The support surfaces 12 and 13 are essentially planar and parallel. In the preferred embodiment of the invention these surfaces 12 and 13 are inclined also in relation to the central axis CL. The rear support surface 12 as well as the recess 14 extend from the underneath side 10A of the milling cutter body at least to an upper shelf 10B of said cutter body. The recess 14 is approximately perpendicularly oriented in relation to the underneath side 10A of the milling cutter. The forwardly located support surface 13 has a shorter dimension in the axial direction of the milling cutter than the rear support surface 12. The forwardly located support surface 13 is arranged on one or several arms 15 that are integral with the milling cutter body 10; in this case two of them are arranged. The support surface 13 is connected forwardly, in the rotary direction R, to a concave chip space 16 via a protruding end face portion 17. Each arm 15 is provided with a recessed smoothly curved portion 18 proximate the underneath side 10A of the milling cutter in order to facilitate chip removal.

Figure 8:
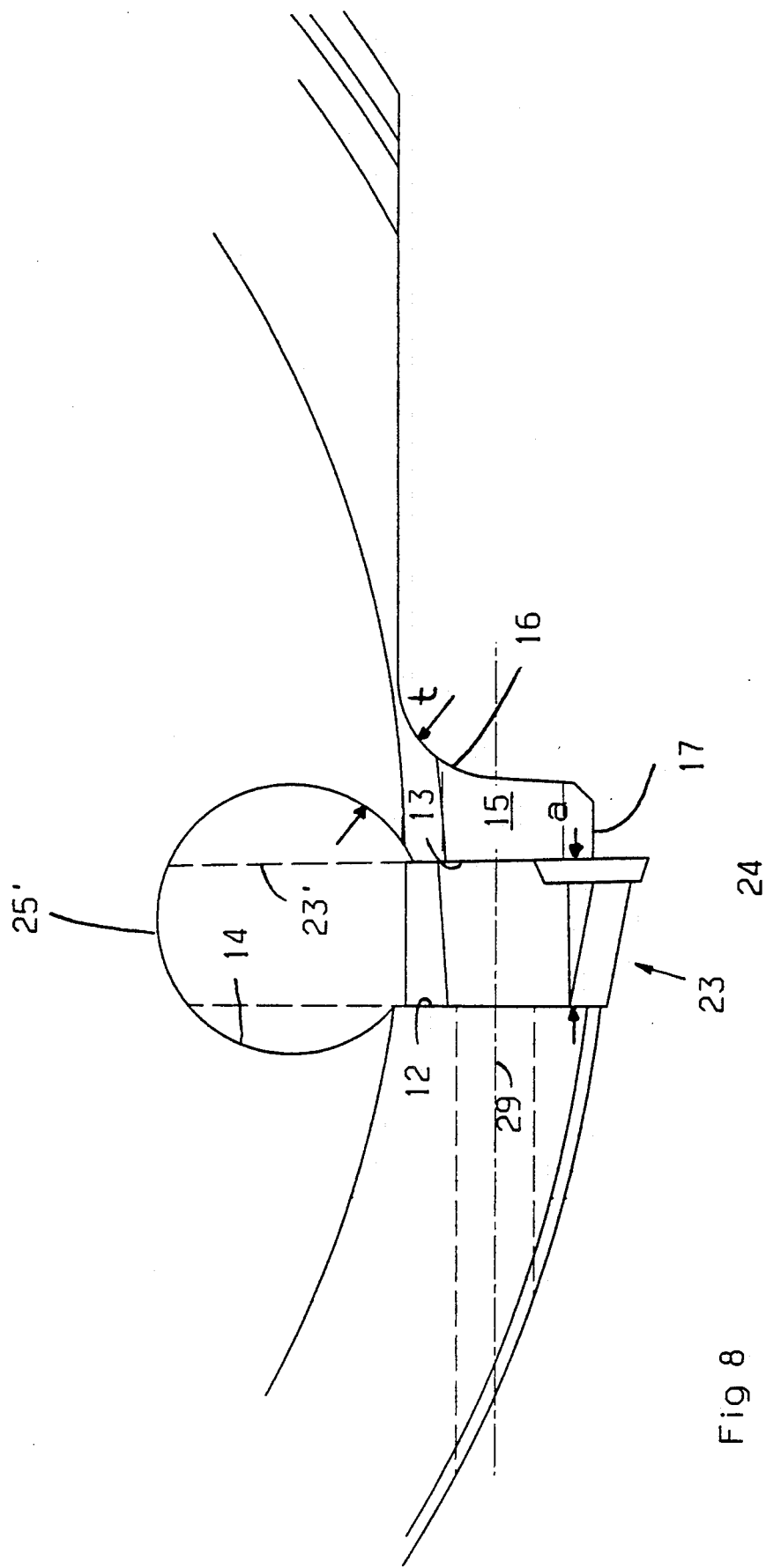
FIG. 8 shows a partial view of the milling cutter shown in FIG. 1.

Two holes 19 and 20 are provided in the arms 15 and in said rear support surface 12 whilst the holes being oriented along a common centre line, said centre line preferably being oriented perpendicularly to the rear support surface 12. This centre line can alternatively be oriented at an obtuse or acute angle from said support surface 12. The hole 20 in said arm is non-threaded and extends forwardly into a recessed portion 21 in said chip space 16 via a plane shoulder 22. The arms 15 are separated from each other by means of a slot 30. The shoulders 22 are mainly plane parallel in relation to the support surface 13. The recess 21 is arranged for the purpose of facilitating chip removal and the mounting of the cutter. The holes 19 provided in the rear support surface 12 are threaded. The smallest thickness t of the arm 15, measured between the chip space 16 and the recess 14 (FIG. 8) is less than the smallest distance a between the support surfaces 12 and 13. The distance a is substantially smaller than the diameter of recess 14. The inner angle between the forwardly located support surface 13 and the chip space 16 around the end face portion 17 is a maximum of 10 degrees. The forwardly located support surface 13 is mainly parallel with the shoulder 22.

In FIG. 5-7 is shown an insert-equipped cartridge 23 designed to be attached to the above described milling cutter body. A cutting insert 24 is located in a seat in the cartridge by means of a screw. The insert could be made of cemented carbide, ceramics or any other type of hard metal which comprises a body with one or several tips with cutting edges of diamond or cubic boron nitride. The cartridge 23 has a plane edge surface 25 which is provided as an abutment surface for an adjustment device. The cartridge has two non-threaded holes 26 for the receipt of thread sections. The cartridge is preferably made of steel and includes a number of clearance faces for avoiding occurrence of traces from the workpiece during the milling operation. The cartridge has a rear surface 27 and a front surface 28 which are planar and parallel. The holes 26 are mainly oriented perpendicularly from the surfaces 27, 28. The cartridge 23 can be made of steel, directly pressed from powder material or ground from a steel blank. Instead of designing the insert 24 as aforesaid one corner might be made of ceramics, cubic boron nitride or diamond and being brazed on to the cartridge or sintered into the latter.

Figure 9:
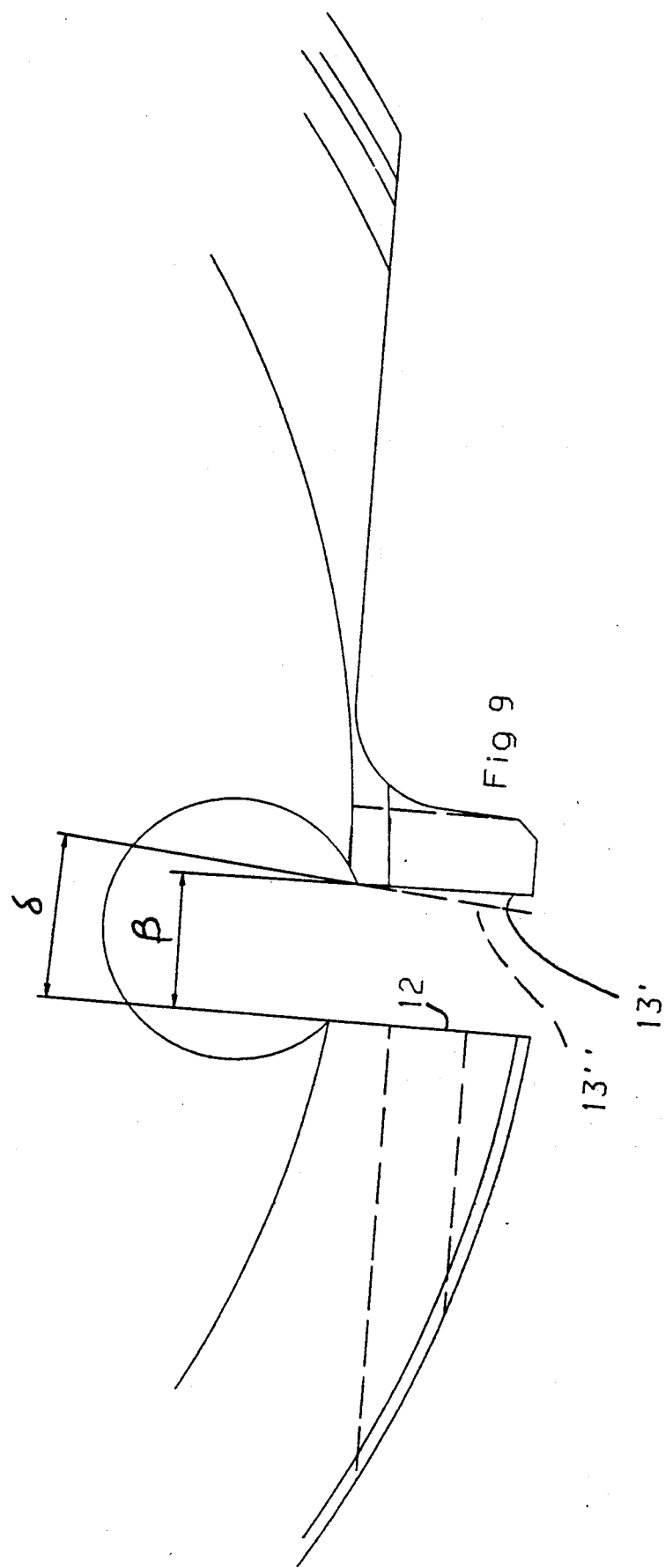
FIG. 9 shows an alternative embodiment of the milling cutter of the invention.
Figure 10:
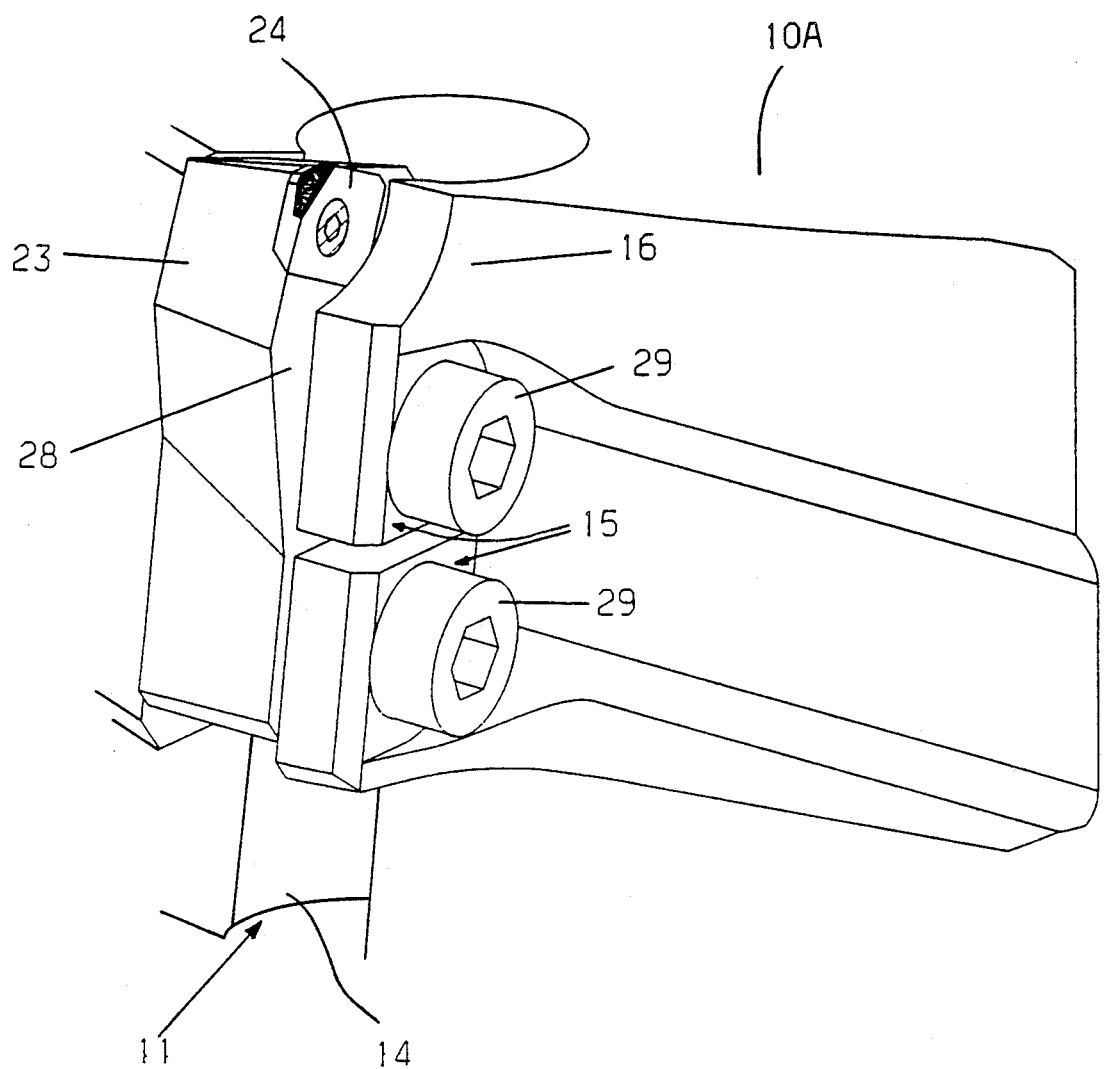
FIG. 10 shows a perspective view of the milling cutter of FIG. 1.

The forwardly located support surface of the milling cutter can alternatively be inclined in relation to the rear support surface 12 as shown in FIG. 9 which shows a cross section between the arms 15. In one case the support surfaces 12 and 13' diverge radially outwardly as shown in enlarged scale whereby a more evenly distributed clamping force can be exerted on the plane parallel cartridge. In that case the angle $\beta$ obtained is 1° or less. In the other case the surface 12 and 13'' converge radially outwards as shown in enlarged scale and provide an angle $\delta$ of about 5° whereby the cartridge might be wedgingly clamped during mounting without assistance of the screws 29. The cartridge is at least partially wedge shaped whereby the nose of the wedge is directed radially outwards so that the resistance towards out-hurling can be improved. The mounting of the cartridge 23 in the milling cutter body 10 is described in the following by reference to primarily FIG. 8 and 10. The insert-equipped cartridge 23 is manually entered into the recess 11 along and proximate the recess 14 until the cartridge reaches an approximately correct position. The arms 15 could eventually be pre-stressed somewhat by means of the screws 29 in connection with the mounting of the cartridge so that the distance between the surfaces 12 and 13 decreases and so that the angle between these surfaces increases. The cartridge is thereafter pushed by hand radially outwards so that it wedgingly fits between the forward support surface 13 and the rear support surface 12. Thereafter an adjustment device (not shown) is inserted which brings about a wedging action from the underneath side in the recess 14 with the purpose of forcing the cartridge radially outwards so as to position and adjust the insert angularly. Another or the same adjustment device (not shown) will exert displacement of the cartridge axially to its desired position. When the cartridge has reached this position screws 29 are inserted (in case the arm 15 is not prestressed) through the holes 20 and 26 and threadably tightened into the bores 19 in the rear support surface 12. When each screws 29 are tightened the arm 15 is caused to clamp the cartridge firmly against the support surface 12. If, for some reason, the cartridge is being displaced before tightening the screw 29 the latter is loosened whereby the position of the cartridge can be adjusted due to the fact that the screw is located with a loose fit in the bore 26 of the cartridge. In the preferred embodiment the cartridge 23 is provided with two holes which improve the possibilities of reaching a stable and tilt-free clamping of the cartridge than compared with a cartridge having just one hole.

When dismounting the milling cutter the screw 29 is removed and the cartridge 23 is pushed inwards towards the recess 14 whereby the clamping pressure around the cartridge ceases and the cartridge is released. Alternatively the clamping pressure around the cartridge ceases entirely at the same time as the screw becomes loose whereby the cartridge can be dismounted. Hence, the invention relates to a milling cutter having recesses for the receipt of cartridges. The milling cutter lacks adjustment devices and the out-hurling force exerted to each cartridge can be minimized. The screw that exerts pressure from the arm towards the cartridge is supported on both sides of the cartridge and the screw can therefor not be bent. The radially inner surface of the cartridge is not in abutment with any other surface during the milling operation. In case it is not desirable to have a radially adjustable cartridge the cartridge 23' might be designed for abutment against the recess 14 according to the dashed line 25' in FIG. 8. The milling cutter is relatively cheap and simple to produce.

We claim:

1. A milling cutter for chip machining of metal workpieces, comprising:
   a milling cutter body defining a longitudinal axis of rotation, said body including an outer peripheral surface containing a plurality of circumferentially spaced recesses, each recess formed by circumferentially spaced front and rear walls integral with said body, said front wall being divided into separate first and second arms which are spaced in a direction parallel to said longitudinal axis,
   a plurality of cutting cartridges received in respective ones of said recessed between said front and rear walls, and
   first and second releasable clamp means arranged adjacent each said recess to contact respective ones of said first and second arms for separately clamping said first and second arms against said cutting cartridge.

2. Milling cutter as defined in claim 1 characterized in that said front wall means includes a pair of holes formed in respective ones of said first and second arms, said rear wall means including a pair of holes aligned with respective ones of said holes in said front wall means, and said cartridge including a pair of holes aligned with respective ones of said holes in said front and rear wall means, said first releasable clamp means comprises a first screw extending through a first set of aligned ones of said holes in said front and rear wall means and said cartridge, and said second releasable clamp means comprises a second screw extending through a second set of aligned ones of said holes in said front and rear wall means and said cartridge.

3. Milling cutter as defined in claim 1 characterized in that each of said cartridges includes a radially inner surface spaced radially outwardly from a radially opposing surface of said body.

4. Milling cutter as defined in claim 3, characterized in that each of said recesses is at least partially wedge-shaped.

5. Milling cutter as defined in claim 4, characterized in that each cartridge is at least partially wedge shaped whereby the nose portion of the wedge is oriented radially outwards.

6. Milling cutter as defined in claim 1 characterized in that each of said cartridges includes an insert-receiving site for removably receiving a cutting insert.

7. Milling cutter as defined in claim 1, characterized in that each cartridge comprises a forward surface and a rear surface, said surfaces being planar and parallel to each other and engaging said front and rear wall means.

8. Milling cutter as defined in claim 1, characterized in that the recess extends from an underneath side to an upper side of the milling cutter.

9. Milling cutter as defined in claim 1, characterized in that each of said arms is provided with a recessed portion proximate an underneath side of the milling cutter body so as to facilitate chip removal.

10. Milling cutter as defined in claim 1, characterized in that the cartridge and the milling cutter body provide a clearance radially inwards of said cartridge.

11. Milling cutter as defined in claim 1, characterized in that the cartridge is provided such that a radially inner surface thereof is in abutment against a radially inner portion of the recess.

12. A milling cutter for chip machining of metal workpieces, comprising:

a milling cutter body defining a longitudinal axis of rotation, said body including an outer peripheral surface containing a plurality of circumferentially spaced recesses, each recess formed by circumferentially spaced front and rear walls integral with said body, said front wall being divided into separate first and second arms which are spaced in a direction parallel to said longitudinal axis, each of said front and rear walls having a pair of holes spaced apart in a direction parallel to said longitudinal axis, said holes in said front wall being aligned with respective ones of said holes in said rear wall, a plurality of cutting cartridge received in respective ones of said recessed between said front and rear walls, each cartridge including a pair of holes extending completely therethrough and aligned with respective ones of said holes in said front and rear walls, a first fastener extending through a first set of aligned ones of said holes in said front and rear walls and said cartridge, and a second fastener extending through a second set of aligned ones of said holes in said front and rear walls and said cartridge, said first and second fasteners defining first and second clamping means for clamping said cartridge between said front and rear walls.

13. A milling cutter according to claim 12, wherein said first and second fasteners comprise screws.

* * * * *